June 24, 1930.  S. A. WIER  1,766,088
APPARATUS FOR CLEANING SURFACES
Filed Feb. 14, 1927   3 Sheets-Sheet 2
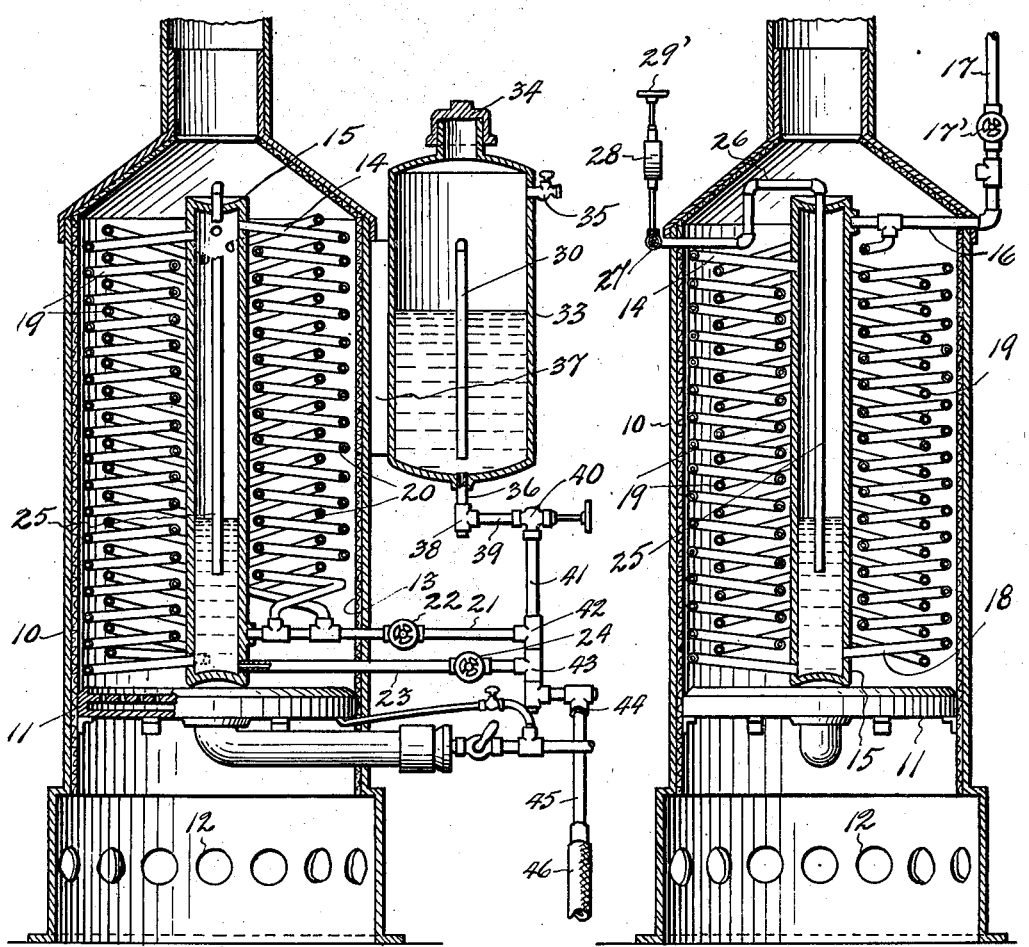
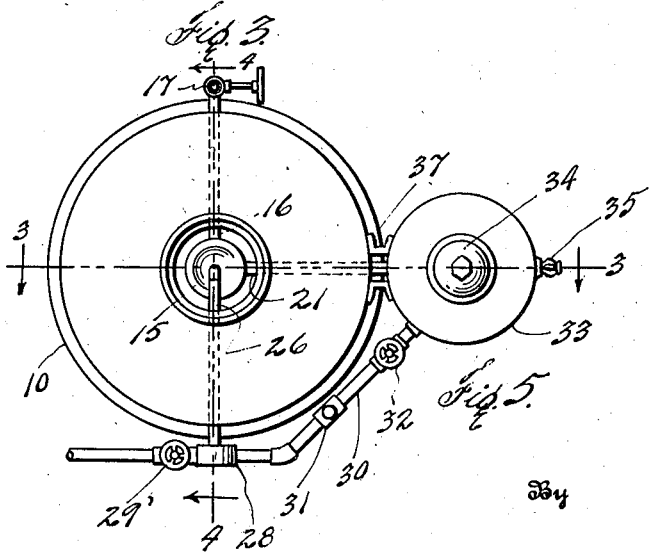
Inventor
S. A. Wier
Attorney June 24, 1930. S. A. WIER 1,766,088
APPARATUS FOR CLEANING SURFACES
Filed Feb. 14, 1927 3 Sheets-Sheet 3
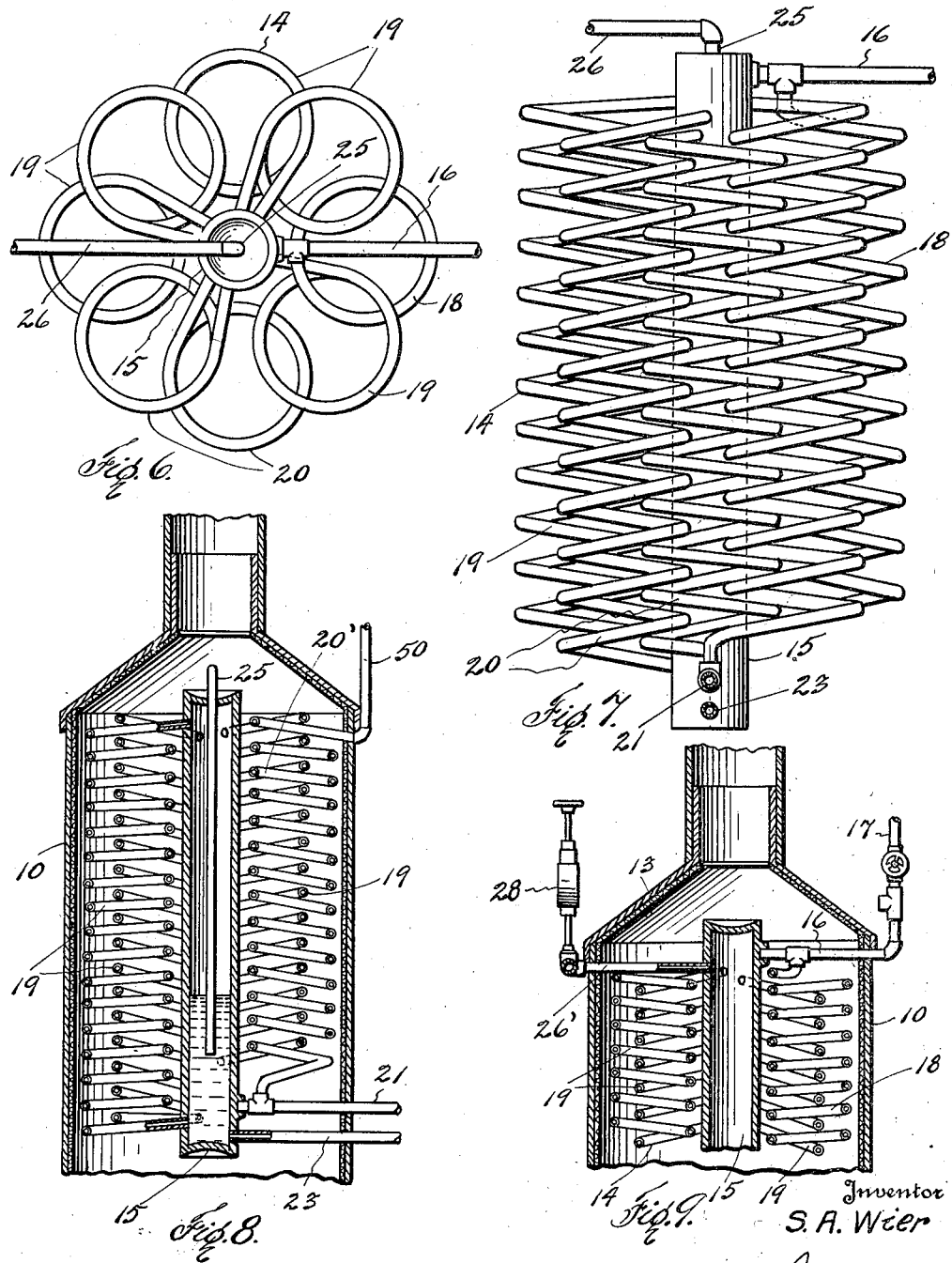

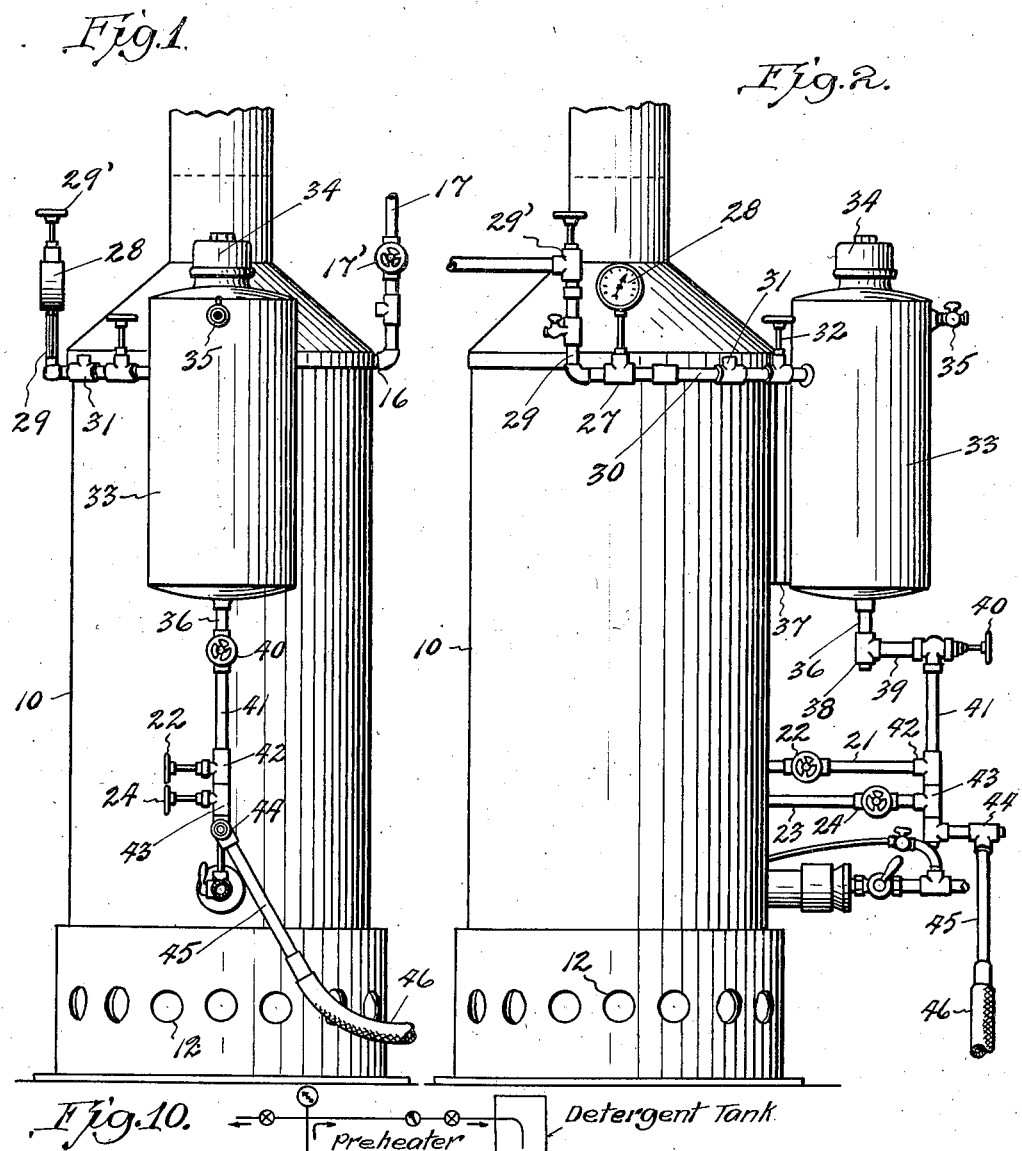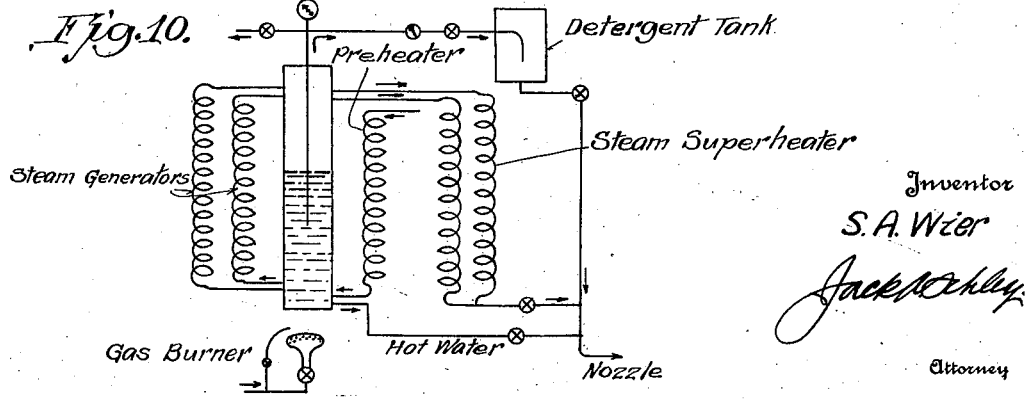

Patented June 24, 1930

1,766,088

UNITED STATES PATENT OFFICE

STUART A. WIER, OF DALLAS, TEXAS, ASSIGNOR TO TRIDEX CORPORATION, OF DALLAS, TEXAS, A CORPORATION OF DELAWARE

APPARATUS FOR CLEANING SURFACES

Application filed February 14, 1927. Serial No. 168,161.

This invention relates to new and useful improvements in apparatuses for cleaning surfaces.

The object of the invention is to make certain improvements and advances over the apparatus set forth in my Patent No. 1,607,034, dated November 16, 1926.

A particular object of the invention is to provide an apparatus wherein a hot fluid is utilized to produce a detergent solution and this solution while hot is delivered into the path of a hot impelling fluid together with a hot liquid, whereby a highly effective cleaning fluid is projected onto the work.

Another object of the invention is to provide an apparatus whereby three fluids of different temperatures and properties may be combined for the production of a cleansing jet having a more efficient action.

A further object of the invention is to provide an apparatus wherein a single generating element may be utilized for producing hot water and steam of various temperatures.

A still further object of the invention is to provide an apparatus whereby heated water may be supplied to a detergent tank for producing a hot detergent solution in the path of a hot impelling fluid; also whereby hot water may be delivered into the path of the impeller and mixed with the solution.

Another object of the invention is to provide means for introducing hot water in various quantities, as may be desired, into a pressure impelled hot detergent solution for the purpose of adding liquid as well as for diluting the solution.

An important object of the invention is to provide an apparatus whereby a spray of clean hot water, free from the detergent solution, may be projected on to the work for washing the same.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a front elevation of an apparatus for carrying out the invention,

Fig. 2 is a side elevation of the same,

Fig. 3 is a transverse vertical sectional view taken on the line 3—3 of Fig. 5,

Fig. 4 is a transverse vertical sectional view taken on the line 4—4 of Fig. 5,

Fig. 5 is a plan view of the apparatus,

Fig. 6 is a plan view of the heating and generating element,

Fig. 7 is a side elevation of the same,

Fig. 8 is a transverse vertical sectional view of a modified form,

Fig. 9 is a partial transverse vertical sectional view of another modification,

Fig. 10 is a diagram of the heating system used.

In the drawings the numeral 10 designates a vertical cylindrical metal jacket of suitable construction and having a fluid fuel burner 11 supported in its lower portion and surrounded by draft openings or perforations 12. Of course any suitable fire may be employed. Above the perforations the jacket has a heat insulating lining 13 of asbestos or equivalent material (Figs. 3 and 4).

Within the jacket is disposed a coil steam generator unit 14. This unit includes a central vertical water column 15 closed at each end (Figs. 3 and 4). A pipe 16 extends from the top of the column 15 through the jacket and is connected with a water supply pipe 17. For successful operation, water must be supplied under pressure, the usual city service pressure being amply sufficient. The inner end of the pipe 16 is plugged and the upper end of a vertical preheating coil 18, (Figs. 4, 6, and 7) is connected in said pipe so as to receive water therefrom. The lower end of this coil enters and supplies water to the lower end of the column 15.

The preheated water stands in the lower end of the column and supplies circulating coils 19 which have their ends connected to the upper and lower ends of the column. A pair of steam coils 20 have their upper ends connected with the top of the column while their lower ends are connected in a steam pipe 21 leading out through the jacket. The inner end of this pipe is plugged and attached to the column. Outside of the jacket the pipe 21 includes a hand valve 22. A hot water discharge pipe 23 leads from the bottom of the column and extends under the pipe 21 through the jacket. A hand valve 24 is inclined in this pipe.

A pick-up pipe 25 extends down through the top of the column 15 and has its lower end immersed in the water therein. A pipe 26 leads from the top of the pipe 25 out through the jacket. The pipe 26 is connected to a T 27. A pressure gauge 28 is connected to the T, while a relief line 29 including a valve 29' is connected to one end of the T. A pipe 30 including a check valve 31 and a hand valve 32 extends from the opposite end of the T. This latter pipe enters the side of a detergent tank 33 and extends downward therein, terminating near its bottom (Fig. 3). The tank has a cap 34 closing its upper end and is also equipped with a pet cock 35 for relieving pressure when it is desired to refill the tank.

The tank is charged with soap or any other detergent which it is desired to use. A pipe 36 leads from the bottom of the tank, which is supported on the side of the jacket by brackets 37. The pipe 36 is connected to a T 38 having its lower end plugged, whereby the tank and pipe may be cleaned by removing the plug. A pipe 39 leads from the T to a hand valve 40 which is connected to a vertical pipe 41. The lower end of the pipe 41 enters a T 42 which is connected to the end of the steam supply pipe 21 and also is connected with a second T 43 into which the outer end of the hot water pipe 23 screws. A discharge pipe 45 has a swivel 44 connected with the T 43 and a hose 46 is fastened on the end of the pipe 45. The parts 25, 26, 27 and 30 may be termed a hot fluid conductor; while the parts 36, 38, 39, 40 and 41 constitute a detergent solution conductor.

In operating the apparatus the burner 11 is lighted after water has been supplied by opening the hand valve 17' in the line 17. The water flows through the pipe 16 to the coil 18 and passes down through the same and into the column 15. The coils 19 are supplied from the column. Sufficient water is supplied at all times to keep the lower end of the pipe 25 immersed. The burner heats the coils and the column so that the incoming water flowing down through the coil 18 is preheated when it enters the bottom of the column 15. The heat causes a circulation through the coils 19 and wet steam is thus generated. This steam escaping from the upper ends of the coils 19 into the top of the column finds an outlet through the coils 20.

It may be found expedient to merely circulate water through the coils 19 so that a hot elastic fluid will be generated at the top of the column and this owing to its greater pressure will escape into the coils 20. The fluid passing down through the coils 20 is heated and finally discharges into the pipe 21 as high pressure steam.

It is obvious that sufficient back pressure will be created on the water in the column to force the same up through the pipe 25 and through the pipe 30 into the tank 33. The tank 33 is charged with a suitable soap or other detergent material and the hot water discharged from the pipe 30 will have sufficient heat and pressure to dissolve the soap and form a hot detergent solution.

By opening the valves 22, 24 and 40 to the proper degree, steam, hot water and a hot detergent solution are supplied. The solution is discharged into the path of the steam at the T 42. The steam acts as an impeller and also as a heating agent and thus carries the solution down through the T 43, where hot water is injected into the line. It will be seen that the hot water being taken from the bottom of the column 15 is quite hot. This water adds liquid to the fluid discharged through the hose 46 and acts to dilute the detergent solution, which may be too rich in soapy content. This hot liquid also adds moisture without reducing the velocity, to an appreciable extent, thus giving a spray at the end of the hose having sufficient force, moisture and temperature to efficiently clean without injury to the paint and varnish or other surface finish.

It is pointed out that the hand valves 22, 24 and 40 provide controls, whereby the supply of the various fluids may be regulated to a minute degree. For instance if the steam seems too dry, the valve 24 can be opened further to supply more hot water, thus adding liquid without reducing the effective velocity of the cleaning fluid or the amount of moisture may be cut down. The supply of steam or detergent solution may likewise be regulated.

After the surface has been cleaned and it is desired to wash off the same, the valve 40 and preferably the valve 32 of the pipe 30, are closed to cut off the supply of solution and also the supply of hot fluid to the tank 33. This provides a generous supply of hot water from the pipe 23, which is impelled by the steam from the pipe 21 as well as by the back pressure in the generator unit. It will be seen that the steam will cause the water to be ejected from the hose in a spray and it thus will be much cooler than if ejected in a solid stream. It is important that the fluid, both with and without the detergent, be ejected at a relatively high velocity, but with sufficient moisture and at a low enough temperature, so that the cleansing will be efficiently done, but without injury or burning of the finish.

The use of steam is for the purpose of atomizing, giving velocity and heat to the cleansing fluid, and it is apparent that other high pressure fluids could be used, if given the proper temperature. In this connection I have shown in Fig. 8 a generator unit in which one of the former steam coils 20' is disconnected from the top of the column 15 and coupled at its upper end to a line 50 from an air compressor. Compressed air forced down through the coil 20' is discharged into the pipe 21, after being heated in the coil. This hot pressure fluid acts as an impeller and a heating agent, the same as the steam. In this form no steam coils are used, the other coil 20 being connected and used the same as the coils 19.

In Fig. 9 I have shown a form in which the pipe 25 is omitted and a pipe 26' is connected direct to the top of the column 15. By this arrangement wet steam is supplied from the top of the column and delivered by the pipe 30 to the tank 33 instead of hot water. This is more like the apparatus set forth in my patent hereinbefore referred to. This steam gives an effective agitation in the tank and condenses to form the detergent solution.

It is highly desirable that a goodly quantity of detergent solution reach the work with sufficient force and heat to dislodge and disintegrate the surface accumulations. It is important that the spray be hot, but not hot enough to injure the paint and varnish. Of course, if a paint remover is being used in the solution then the temperature of the spray is not so important. By reason of the five circulating coils 19 combined with the preheating coil 18, I am enabled to obtain a relatively large supply of hot water or saturated steam for the tank 33, as compared with the superheated steam supplied by the two coils 20. This enables the using of a stronger detergent mixture in the tank 33, particularly in view of the diluting water supplied from the pipe 23. This was not possible in my patent. I can load the tank 33 with enough detergent to last all day and I can control the strength of the solution by operating the valves 24 and 40. After the surface is cleaned, I can open valve 24 wide and close valve 40 and wash off the surface with clean hot water impelled by the steam from the coils 20 and the pipe 21.

What I claim, is:

1. In a surface cleaning apparatus, a generator for producing hot fluids and including a central vertical column surrounded by coils, a tank for containing a detergent solution means for conducting a hot fluid of water content from the column to the tank, one of said coils having a connection for receiving water under pressure and delivering it to the column, another of said coils having its upper end only connected with the column, a steam conductor leading from the bottom of said last named coil, a solution conductor leading from the tank, a liquid conductor connected with the lower portion of the column and also connected with the solution and steam conductors, and a distributor receiving fluids from all three of said conductors.

2. In an apparatus of the character described, a generating unit comprising a central column surrounded by coils, one of said coils having a connection with a pressure feed water pipe and connected to the bottom of the column, a pick-up pipe extending down into the column, a detergent tank, means for conveying hot fluids from the pick-up pipe to the detergent tank, some of the other coils being connected with the column for circulating the water, one of said coils having its upper end only connected to the column, a steam conductor leading from the lower end of said last named coil, a hot water conductor leading from the bottom of the column, a solution conductor leading from the bottom of the tank, and a distributor connected with all of said conductors whereby the fluids from said conductors are admixed and such mixture is conveyed to a point of discharge.

3. In an apparatus for cleaning surfaces, a generator comprising a unit having means for producing over a common fire three fluids comprising hot water, saturated steam and superheated steam, a detergent tank connected with the generator to receive therefrom one of said fluids of water content adapted to provide a hot detergent solution, a discharge conductor leading from the tank, a conductor extending from the generator and supplied with hot water thereby, a superheated steam conductor extending from the generator to the solution discharge conductor, the hot water conductor being connected with the solution discharge conductor for diluting said solution, a distributor with which all of said conductors are connected and through which the diluted solution is impelled by the superheated steam.

4. As a sub-combination in an apparatus for cleaning surfaces, a generator including a vertical central column and a plurality of vertical coils disposed around said column, one of said coils having connection with a water supply at one end and connected with the bottom of the column at the other end, the major portion of said coils being connected at their ends with the top and bottom of the column for circulating the water and steam, and another portion of said coils being connected with the top of the column at their upper ends, a steam discharge pipe at the bottom of the said last named coils, a burner under the generator and also under the steam discharge pipe, and a hot water discharge pipe extending from the bottom of the column and immediately over the burner.

5. As a sub-combination in an apparatus for cleaning surfaces, a generating unit comprising a central vertical column, a vertical preheating coil at one side of the column and having its upper end connected with a water supply and its lower end connected to the lower end of the column, a plurality of vertical circulating coils disposed radially of the column and having both their upper and lower ends connected to the column, and a vertical steam coil at one side of the column and having one end connected with the upper end of the column and its lower discharge end free from the column.

6. As a sub-combination in an apparatus for cleaning surfaces, a generating unit comprising a central vertical water column, a vertical preheating coil having its upper end connected with a water supply and its lower end connected to the lower end of the column, a plurality of vertical circulating coils each disposed radially of the column and having their upper and lower ends connected to the column, a vertical steam coil having its upper end connected with the upper end of the column and its lower discharge end free from the column, and fluid discharge pipes leading from the top and lower end of the column.

7. In an apparatus of the character described, an upright jacket, a generating unit mounted in the jacket and including a central vertical column having vertical coils disposed radially thereof, some of said coils being connected at their ends to the top and bottom of the column for circulating water while one of said coils is connected only to the bottom of the column for preheating water and another of said coils is connected only at its top to the top of the column for superheating steam, a detergent tank attached to the outer side of the jacket, a pipe leading from the column of the generating unit to the said tank, a pipe conductor leading from the bottom of the tank for conducting a detergent solution, a pipe leading from the bottom of the steam coil to said solution conductor, a hot water pipe leading from the bottom of the unit column and connected with said solution conductor, a distributor conductor connected with the solution conductor, and a fuel burner immediately under the generating unit, the steam and hot water pipes at the bottom of the unit being directly in the path of the flames of said burner.

8. In an apparatus of the character described, an upright generator including a water container extending vertically within said generator and also having a plurality of steam generating coils connected with said water container one of which is adapted to superheat a portion of said steam, a detergent tank mounted contiguous to said generator and in fixed relation thereto, a conductor leading directly from the water container of the generator to the detergent tank for conducting a hot fluid of water content to the tank to form a hot detergent solution in said tank, a discharge pipe leading from the tank, a separate steam conductor leading from the superheating coil and directly connected with the tank discharge pipe for mixing with and impelling the discharged hot detergent solution, a hot water conducting pipe extending from the generator and directly connected with the discharge pipe, for diluting the solution or for supplying hot rinsing water when the solution is cut off, and a distributing conductor for carrying the steam impelled fluids to a point of final discharge.

9. In an apparatus for cleaning surfaces, a unit construction comprising an upright jacket, a detergent tank rigidly mounted on the outside of the jacket, a generating unit supported within the jacket and including an upright water container and a plurality of coils connected with said container one of which is disposed to produce superheated steam, a conductor directly connecting the water container with the top of the tank, a gravity discharge pipe depending from the bottom of the tank, a steam pipe connected with the superheated steam coil of the generator and also directly connected with discharge pipe, a gravity feed hot water pipe extending directly from the water container of the generator to the discharge pipe, and a distributor connected with the discharge pipe, the steam pipe and the hot water pipe.

10. In an apparatus for cleaning surfaces, a generator including an upright water container and a plurality of heating coils connected with said container, a detergent tank contiguous to the generator, a pick-up pipe extending down into the water container of the generator to below the water level thereof, a pipe connected with the pick-up pipe for carrying hot water to the top of the detergent tank, a steam pipe leading from the generator for ejecting impelling steam, a gravity discharge pipe extending from the tank and with which the steam pipe is connected for impelling the fluid discharged, a hot water pipe leading from the generator to the discharge pipe, and a distributor connected with the steam pipe, hot water pipe, and the discharge pipe adjacent their point of connection.

11. In a surface cleaning apparatus, a generator for producing hot fluids, a detergent tank, means for conducting a hot fluid of water content from the generator to provide a liquid within the tank, means for conveying the detergent liquid from the tank, means for conducting a hot liquid from the generator for mixture with the detergent liquid after delivery from the tank, means for superheating and conveying a hot gaseous fluid from the generator independently of the hot liquid for mixing with and impelling the detergent solution after formation, and a conductor for conveying the solution, hot liquid and gaseous fluid from the point of mixture.

12. In a surface cleaning apparatus, a generator unit for producing hot fluids, a detergent tank, means for conducting a hot fluid of water content from the generator to the tank to form a detergent solution therein, a discharge pipe extending from the tank, means for producing steam, means for further heating said steam, a conductor leading the further heated steam from the generator, a hot water pipe leading from the generator, and a distributing conductor connected with the tank discharge pipe the steam conductor and the hot water pipe.

13. In an apparatus of the character described, a generator unit constructed to produce from a single source of supply and separately discharge a fluid of water content, a gaseous superheated fluid, and a hot liquid, a solution container communicating with the fluid of water content to form a detergent solution, a discharge for the solution from the container and a mixer at the discharge in communication with the superheated fluid and hot liquid, whereby the solution is diluted by the liquid and impelled by the superheated fluid.

14. In an apparatus for cleaning surfaces, a generator for producing a hot fluid of water content and a superheated steam, a detergent container contiguous to the generator, a conductor for conveying hot fluid directly from the generator to the container to produce a hot detergent solution, a discharge conductor leading from the container and free from connection with the said hot fluid conductor, and a steam conductor connected with the generator for directly conveying the superheated steam to the discharge conductor, whereby the steam and hot solution are mixed and impelled, a third conductor leading directly from the generator to the discharge conductor for supplying hot water to dilute the flowing stream of solution, and means for conducting the steam impelled mixture to the work.

In testimony whereof I affix my signature.

STUART A. WIER.